United States Patent
Li et al.

(10) Patent No.: US 11,561,645 B2
(45) Date of Patent: Jan. 24, 2023

(54) TOUCH DISPLAY PANEL AND TOUCH DISPLAY DEVICE

(71) Applicant: Hubei Yangtze Industrial Innovation Center of Advanced Display Co., Ltd., Wuhan (CN)

(72) Inventors: Ying Li, Wuhan (CN); Yongxiang Lin, Wuhan (CN)

(73) Assignee: Hubei Yangtze Industrial Innovation Center Of Advanced Display Co., Ltd., Wuhan (CN)

( * ) Notice: Subject to any disclaimer, the term of this patent is extended or adjusted under 35 U.S.C. 154(b) by 0 days.

(21) Appl. No.: 17/659,492

(22) Filed: Apr. 18, 2022

(65) Prior Publication Data

US 2022/0236849 A1    Jul. 28, 2022

(30) Foreign Application Priority Data

Dec. 31, 2021   (CN) .......................... 202111673514.X

(51) Int. Cl.
*G06F 3/041*   (2006.01)
*G06F 3/044*   (2006.01)

(52) U.S. Cl.
CPC ........ *G06F 3/04164* (2019.05); *G06F 3/0412* (2013.01); *G06F 3/0443* (2019.05); *G06F 3/0446* (2019.05); *G06F 2203/04111* (2013.01)

(58) Field of Classification Search
None
See application file for complete search history.

(56) References Cited

U.S. PATENT DOCUMENTS

2018/0190724 A1\*   7/2018   Kang ..................... H01L 27/323
2018/0321764 A1\*   11/2018  Oh ....................... H01L 27/3276

\* cited by examiner

Primary Examiner — Krishna P Neupane
(74) Attorney, Agent, or Firm — Kilpatrick Townsend & Stockton, LLP

(57) ABSTRACT

Provided a touch display panel includes a signal transmission layer, an insulation layer, and a touch layer disposed in stack. A surface of the signal transmission layer is provided with first concave-convex structure. The insulation layer covers the first concave-convex structure, and a surface thereof is provided with a second concave-convex structure at least partially overlapping the first concave-convex structure in a light exit direction. The second concave-convex structure includes a second convex portion, a second concave portion, and a second connecting portion, thickness of the second connecting portion smaller than either thickness of the second convex portion or thickness of the second concave portion. A connection via hole is further provided, penetrates at least the second connecting portion, exposes part of the signal transmission layer, and the touch layer electrically connected to the signal transmission layer through the connection via hole.

20 Claims, 6 Drawing Sheets

TOUCH DISPLAY PANEL AND TOUCH DISPLAY DEVICE

CROSS-REFERENCE TO RELATED APPLICATION

This application claims priority to Chinese Patent Application No. 202111673514.X filed Dec. 31, 2021, the disclosure of which is incorporated herein by reference in its entirety.

FIELD

Embodiments of the present disclosure relates to the field of display technologies, and more particularly to a touch display panel and a touch display device.

BACKGROUND

With the rapid development of the display technologies, touch display panels are widely used. A touch display panel combines a touch panel and a display panel, to enable the display panel to have functions of both displaying and perceiving a touch input. In order to realize the touch control function, it is generally necessary to bridge between different film layers, and it is prone to presenting a problem of poor contact.

SUMMARY

It is provided according to embodiments of the present disclosure a touch display panel and a touch display device to address the problem of poor contact or connection of a touch layer to a signal transmission layer caused by incomplete etching at a position with larger thickness in a film layer due to process fluctuations.

It is provided according to embodiments of the present disclosure a touch display panel including a signal transmission layer, an insulation layer, and a touch layer which are disposed in stack.

A surface of the signal transmission layer is provided with a first concave-convex structure.

The insulation layer covers the first concave-convex structure, and a surface of the insulation layer is provided with a second concave-convex structure which at least partially overlaps the first concave-convex structure in a light exit direction of the touch display panel. The second concave-convex structure includes a second convex portion protruding towards the touch layer, a second concave portion recessed towards the signal transmission layer, and a second connecting portion connecting each of the second convex portion and the second concave portion, and the thickness of the second connecting portion being smaller than the thickness of the second convex portion and the thickness of the second concave portion.

A connection via hole is further provided, the connection via hole penetrates at least the second connecting portion and exposes part of the signal transmission layer, and the touch layer is electrically connected to the signal transmission layer through the connection via hole.

It is further provided according to embodiments of the present disclosure a touch display device including a touch display panel, and the touch display panel includes a signal transmission layer, an insulation layer, and a touch layer which are disposed in stack.

A surface of the signal transmission layer is provided with a first concave-convex structure.

The insulation layer covers the first concave-convex structure, and a surface of the insulation layer is provided with a second concave-convex structure which at least partially overlaps the first concave-convex structure in a light exit direction of the touch display panel. The second concave-convex structure includes a second convex portion protruding towards the touch layer, a second concave portion recessed towards the signal transmission layer, and a second connecting portion connecting each of the second convex portion and the second concave portion, and the thickness of the second connecting portion being smaller than the thickness of the second convex portion and the thickness of the second concave portion.

A connection via hole is further provided, the connection via hole penetrates at least the second connecting portion and exposes part of the signal transmission layer, and the touch layer is electrically connected to the signal transmission layer through the connection via hole.

BRIEF DESCRIPTION OF DRAWINGS

The embodiments of the present disclosure or the related art are described more clearly, drawings to be used in the description of the embodiments or the related art are briefly described hereinafter. Apparently, while the drawings in the description are some embodiments of the present disclosure, these drawings may be expanded and extended to other structures and drawings according to the other embodiments of the present disclosure. These are within the scope of the claims of the present disclosure.

DETAILED DESCRIPTION

The embodiments of the present disclosure will be described clearly and completely with reference to the accompanying drawings in the embodiments of the present disclosure will be clearer. Apparently, the embodiments described below are part, not all, of the embodiments of the present disclosure. The embodiments of the present disclosure fall within the scope of protection of the present disclosure.

Figure 1:
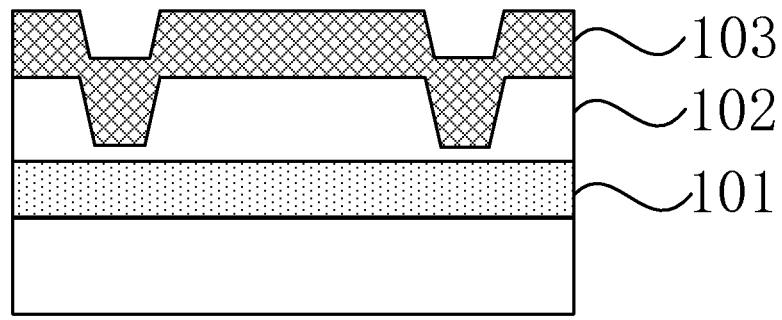
FIG. 1 is a schematic structural view of a touch display panel in the related art.

FIG. 1 is a schematic structural view of a touch display panel in the related art. As shown in FIG. 1, in a conventional touch display panel, a touch layer 103 needs to be electrically connected to a signal transmission layer 101 in an array substrate to implement a touch control function thereof. A specific implementation is as follows: a via hole is formed in an isolation layer 102 located between the touch layer 103 and the signal transmission layer 101 by etching, and the touch layer 103 is electrically connected to the signal transmission layer 101 through the via hole. However, since fluctuations may be presented in the manufacturing process of the isolation layer 102, various positions in the isolation layer 102 have different thicknesses. In a preparing process of the via hole by etching the isolation layer 102, a position with a larger thickness of the isolation layer 102 may not be completely etched, resulting in that the touch layer 103 cannot contact or joint the signal transmission layer 101, adversely affecting the touch control function of the display panel.

A touch display panel is provided according to embodiments of the present disclosure. The touch display panel includes a signal transmission layer, an insulation layer, and a touch layer, and the signal transmission layer, the insulation layer, and the touch layer are disposed in a stack. A surface of the signal transmission layer is provided with a first concave-convex structure. The insulation layer covers the first concave-convex structure, and a surface of the insulation layer is provided with a second concave-convex structure which at least partially overlaps the first concave-convex structure in a light exit direction of the touch display panel. The second concave-convex structure includes a second convex portion protruding towards the touch layer, a second concave portion recessed towards the signal transmission layer, and a second connecting portion connecting each of the second convex portion and the second concave portion, a thickness of the second connecting portion is smaller than either a thickness of the second convex portion or a thickness of the second concave portion. A connection via hole is further provided, the connection via hole penetrates at least the second connecting portion, exposes part of the signal transmission layer, and the touch layer is electrically connected to the signal transmission layer through the connection via hole.

In the touch display panel according to the embodiments of the present disclosure, the surface of the signal transmission layer is provided with the first concave-convex structure, the insulation layer covers the signal transmission layer and is correspondingly provided with the second concave-convex structure, and the second concave-convex structure at least partially overlaps the first concave-convex structure in the light exit direction of the touch display panel, to facilitate preparation of the connection via hole in the second concave-convex structure in the overlapping region to achieve the connection of the touch layer to the signal transmission layer. Considering a practical process, the thickness of the second connecting portion in the second concave-convex structure is smaller than the thickness of the second convex portion and is smaller than the thickness of the second concave portion in the second concave-convex structure, even if there is process fluctuation, the thickness of the second connecting portion is still small. Therefore, when preparing the connection via hole in the second connecting portion with a relatively small thickness, the connection via hole is easier to penetrate the second concave-convex structure of the insulation layer, to form the penetrating connection via hole in the second connecting portion of the second concave-convex structure to expose part of the signal transmission layer, and the touch layer is electrically connected to the signal transmission layer through the connection via hole, to realize the touch-control function and improving the reliability of the touch display panel.

The embodiments of the present disclosure will be described in detail below with reference to the drawings in the embodiments of the present disclosure.

Figure 2:
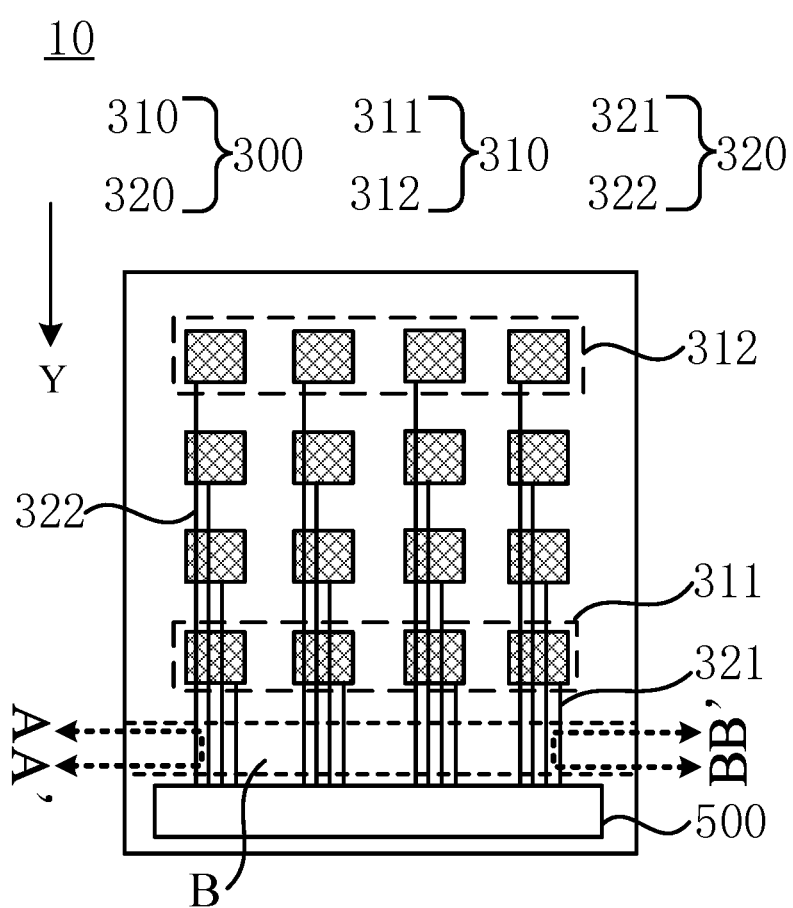
FIG. 2 is a schematic top view of a touch display panel according to embodiments of the present disclosure.
Figure 3:
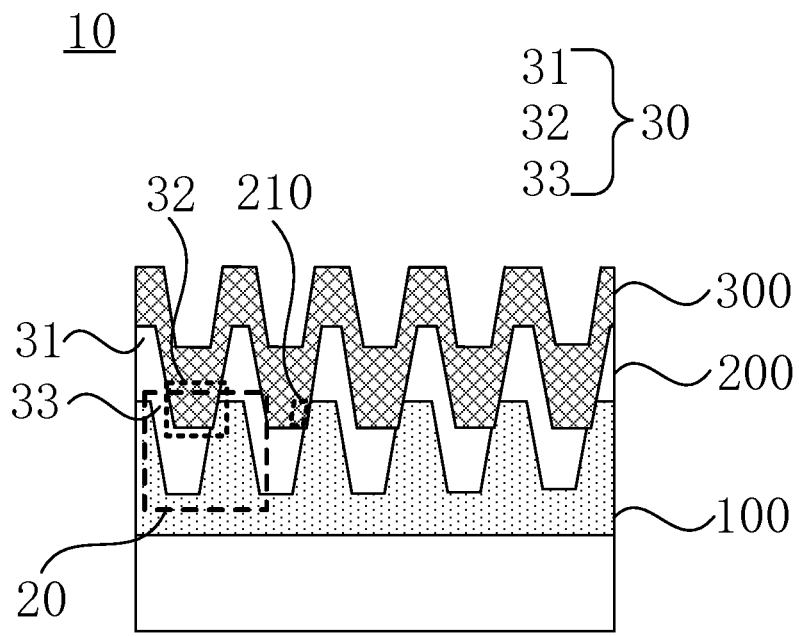
FIG. 3 is a schematic cross-sectional view taken along a sectional line AA' in FIG. 2.

FIG. 2 is a schematic top view of a touch display panel 10 according to embodiments of the present disclosure, and FIG. 3 is a schematic cross-sectional view taken along a sectional line AA' in FIG. 2. With reference to FIG. 2 and FIG. 3, the touch display panel 10 according to the embodiments of the present disclosure includes a signal transmission layer 100, an insulation layer 200, and a touch layer 300 disposed in a stack. A surface of the signal transmission layer 100 is provided with a first concave-convex structure 20. The insulation layer 200 covers the first concave-convex structure 20, and a surface of the insulation layer 200 is provided with a second concave-convex structure 30 which at least partially overlaps the first concave-convex structure 20 in a light exit direction of the touch display panel 10. The second concave-convex structure 30 includes a second convex portion 31 protruding towards the touch layer 300, a second concave portion 32 recessed towards the signal transmission layer 100, and a second connecting portion 33 connecting each of the second convex portion 31 and the second concave portion 32, a thickness of the second connecting portion 33 is smaller than either the thickness of the second convex portion 31 or the thickness of the second concave portion 32. A connection via hole 210 is provided, penetrates at least the second connecting portion 33, and exposes part of the signal transmission layer 100, and the touch layer 300 is electrically connected to the signal transmission layer 100 through the connection via hole 210.

As an example, with reference to FIG. 2 and FIG. 3, the touch display panel 10 according to the embodiments of the present disclosure includes the signal transmission layer 100, the insulation layer 200, and the touch layer 300. The touch layer 300 is a film layer for implementing a touch control function. The signal transmission layer 100 is a film layer capable of transmitting electrical signals. In order to prevent different electrical signals from interfering each other, the insulation layer 200 is provided between the touch layer 300 and the signal transmission layer 100. The touch layer 300 is electrically connected to the signal transmission layer 100 through the connection via hole 210 in the insulation layer 200, to realize the touch control function of the touch display panel 10. In some embodiments, the surface of the signal transmission layer 100 is provided with the first concave-convex structure 20, the insulation layer 200 covers the first concave-convex structure 20 and includes the second concave-convex structure 30 corresponding to the first concave-convex structure 20. The second concave-convex structure 30 at least partially overlaps the first concave-convex structure 20 in the light exit direction of the touch display panel 10, that is, an overlapping region exists between the second concave-convex structure 30 and the first concave-convex structure 20, to facilitate hole opening in the second concave-convex structure 30 in the overlapping region to achieve the connection of the touch layer 300 with the signal transmission layer 100. The second concave-convex structure 30 includes the second convex portion 31 protruding towards the touch layer 300, the second concave portion 32 recessed towards the signal transmission layer 100, and the second connecting portion 33 connecting each of the second convex portion 31 and the second concave portion 32. Due to the structural characteristics and the preparing process of the second concave-convex structure 30, the thickness of the second connecting portion 33 is made smaller than either the thickness of the second convex portion 31 or the thickness of the second concave portion 32. Even if there is process fluctuation, the thickness of the second connecting portion 33 is still small. Therefore, when preparing the connection via hole 210 by the process such as etching in the second connecting portion 33 having a relatively small thickness, it is easier to penetrate the second concave-convex structure 30 of the insulation layer 200, to form the penetrating connection via hole 210 in the second connecting portion 33 of the second concave-convex structure 30 to expose part of the signal transmission layer 100, to allow the touch layer 300 to be electrically connected to the signal transmission layer 100 through the connection via hole 210, to realize the touch-control function and improving the reliability of the touch display panel 10.

It should be noted that the connection via hole 210 in FIG. 3 as penetrating the second connection section 100 is only illustrated as an example rather than as limitation. In order to increase a contact area between the touch layer 300 and the signal transmission layer 100 and to increase the signal transmission rate, the connection via hole 210 may penetrate the second convex portion 31 of the second concave-convex structure 30 in addition to penetrating the second connecting portion 33. Furthermore, specific shapes of the first concave-convex structure 20 and the second concave-convex structure 30 are not limited in the embodiments of the present disclosure, which may be provided according to practical conditions. For example, cross-sectional shapes of the first concave-convex structure 20 and the second concave-convex structure 30 may be trapezoidal (with reference to FIG. 3), rectangular or other shapes in a direction perpendicular to the plane where the touch display panel 10 is located, as long as there is an overlapping region between the second concave-convex structure 30 and the first concave-convex structure 20.

It would be appreciated that FIG. 3 shows only a part of film layers of the touch display panel 10. Like a conventional display panel, the touch display panel 10 may include a substrate, a gate, a gate insulation layer, an active layer, an interlayer insulation layer, a source-drain layer (a second metal layer), a planarization layer, a third metal layer, a pixel defining layer, an anode, a light emitting layer, a cathode, a thin film encapsulation layer, and the like. The third metal layer is commonly used as a jumper layer between the second metal layer and the anode, and may also be used as a high power supply voltage signal line to transmit PVDD signals. In some embodiments, the signal transmission layer 100 may be a third metal layer, and the insulation layer 200 may be any one or more film layers between the signal transmission layer 100 and the touch layer 300. For example, in a case where the signal transmission layer 100 is a third metal layer, the insulation layer 200 may be a thin film encapsulation layer.

It is further to be noted that, the specific arrangement of the touch layer 300 is not limited by the embodiments of the present disclosure. The touch layer 300 may be a touch layer of a self-capacitance structure shown in FIG. 2, or may be a touch layer of a mutual-capacitance structure (not shown). Whether the touch layer is the touch layer of the self-capacitance structure or the touch layer of the mutual-capacitance structure, the touch layer needs to transmit touch signals through the signal transmission layer to ensure that the touch layer can normally implement the touch control function.

In the touch display panel according to the embodiments of the present disclosure, the surface of the signal transmission layer is provided with the first concave-convex structure, the insulation layer covers the signal transmission layer and is correspondingly provided with the second concave-convex structure, and the second concave-convex structure at least partially overlaps the first concave-convex structure in the light exit direction of the touch display panel, to facilitate hole opening in the second concave-convex structure in the overlapping region to achieve the connection of the touch layer with the signal transmission layer. Considering the practical process, the thickness of the second connecting portion in the second concave-convex structure is smaller than either the thickness of the second convex portion or the thickness of the second concave portion in the second concave-convex structure, and even if there is process fluctuation, the thickness of the second connecting portion is still small. Therefore, when preparing the connection via hole in the second connecting portion having a relatively small thickness, it is easier to penetrate the second concave-convex structure of the insulation layer, to form the penetrating connection via hole in the second connecting portion of the second concave-convex structure to expose part of the signal transmission layer, and the touch layer is electrically connected to the signal transmission layer through the connection via hole, to realize the touch-control function and improving the reliability of the touch display panel.

Figure 4:
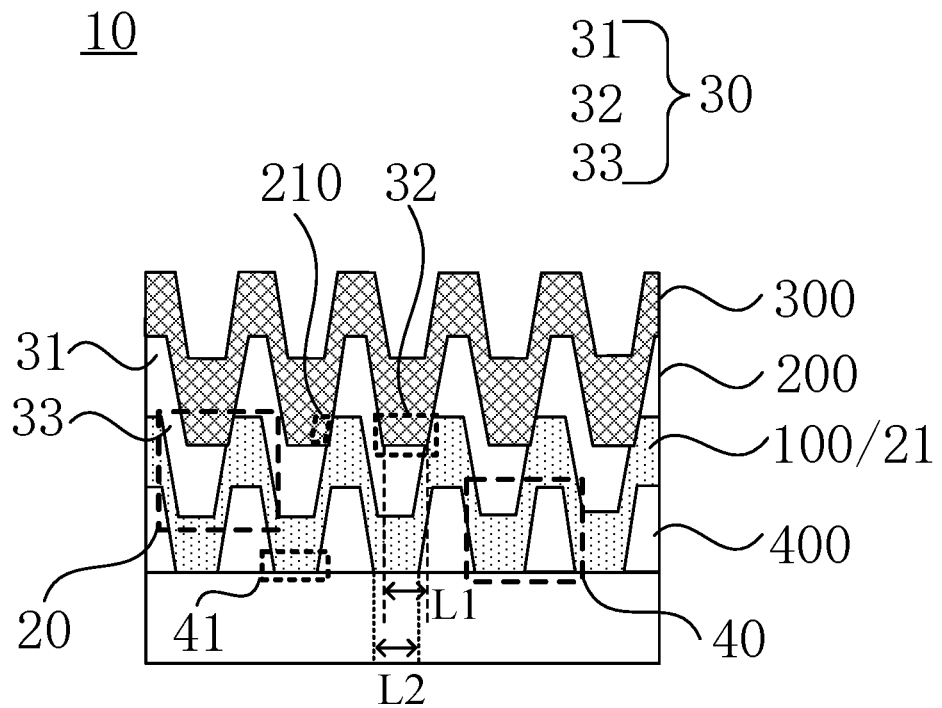
FIG. 4 is another schematic cross-sectional view taken along the sectional line AA' in FIG. 2.

FIG. 4 is another schematic cross-sectional view taken along the sectional line AA' in FIG. 2. As shown in FIG. 4, in some embodiments, the touch display panel 10 further includes a first film layer 400 on a side, away from the insulation layer 200, of the signal transmission layer 100. A surface of the first film layer 400 is provided with a third concave-convex structure 40. The signal transmission layer 100 covers the third concave-convex structure 40 and the first concave-convex structure 20 is arranged corresponding to the third concave-convex structure 40.

Referring to FIG. 4, the surface of the first film layer 400 is provided with the third concave-convex structure 40, and since the signal transmission layer 100 covers the third concave-convex structure 40, the signal transmission layer 100 having the first concave-convex structure 20 is easily formed when the signal transmission layer 100 is prepared on the surface having the third concave-convex structure 40. In addition, the first concave-convex structure 20 of the signal transmission layer 100 is configured to have the same undulating state as the third concave-convex structure 40 of the first film layer 400, that is, the first concave-convex structure 100 is configured corresponding to the third concave-convex structure 100, and the process flow can be simplified.

Further, in some embodiments, as shown in FIG. 4, the third concave-convex structure 40 may be formed by preparing a groove on the surface of the first film layer 400 and by making the groove to completely pass through the first film layer 400. In other embodiments, the third concave-convex structure 40 may be formed by preparing the groove on the surface of the first film layer 400 and by making the groove to partially pass through the first film layer 400, which is not shown in the Figures. The embodiments of the present disclosure do not limit the formation of the third concave-convex structure 40, as long as it can be ensured that the third concave-convex structure 40 is provided in the first film layer 400, and meanwhile the film layer above the first film layer 400 is provided with other concave-convex structure corresponding to the third concave-convex structure 40. For example, the first signal transmission layer 100 is provided with a first concave-convex structure 20, the insulation layer 200 is provided with a second concave-convex structure 30, which can make sure that the second connecting portion 33 in the second concave-convex structure 30 has a small thickness, and the touch layer 300 may be in contact with the signal transmission layer 100 through the connection via hole 210 provided in the second connecting portion 33.

In other embodiments, the first film layer 400 may be a planarization layer. In a case where the first film layer 400 is a planarization layer, by providing the third concave-convex structure 40 on a surface, close to the signal transmission layer 100, of the planarization layer, it is ensured that the surface of the signal transmission layer 100 is correspondingly provided with the first concave-convex structure 10. It may be appreciated that in other embodiments, the first film layer 400 may also be other film layer, such as other organic film layer. Further, since the film thickness of an organic film layer is generally large, by providing the third concave-convex structure 40 in the organic film layer, it can be ensured that a large height difference can be provided between a convex surface of the third concave-convex structure 40 and a concave surface of the third concave-convex structure 40, and it can be ensured that film layers above the first film layer 400 can be subsequently provided with other concave-convex structures corresponding to the third concave-convex structure 40. For example, the first signal transmission layer 100 is provided with the first concave-convex structure 20 and the insulation layer 200 is provided with the second concave-convex structure 30, to ensure contact and electrical connection between the touch layer 300 and the signal transmission layer 100.

With reference to FIG. 4, in some embodiments, the first concave-convex structure 20 includes a first convex portion 21 protruding towards the insulation layer 200; and in the light exit direction of the touch display panel 10, the second connecting portion 33 at least partially overlaps a sidewall of the first convex portion 21, and the connection via hole 210 exposes a sidewall of at least one side of the first convex portion 21.

The first convex portion 21 of the first concave-convex structure 20 is closer to the upper touch layer 300 than other portions of the first concave-convex structure 20 in the signal transmission layer 100, therefore, the connection via hole 210 is formed in a vicinity of the first convex portion 21, and thus, the depth of the connection via hole 210 can be reduced, the process difficulty can be reduced, and the connection via hole 210 penetrating the insulation layer 200 is easier to be formed. Further, by providing that an overlapping region exists between the first convex portion 21 of the first concave-convex structure 20 in the signal transmission layer 100 and the second connecting portion 33 of the second concave-convex structure 30 in the insulation layer 200 in the light exit direction of the touch display panel 200, that is, the second connecting portion 33 at least partially overlaps the sidewall of the first convex portion 21, it facilitates hole opening in the insulation layer 200 in the overlapping region, to expose the sidewall of at least one side of the first convex portion 21 in the signal transmission layer 100, realizing the electrical connection between the touch layer 300 and the first convex portion 21.

On the basis of the above-described embodiment, how the connection via hole 210 exposes a sidewall of at least one side of the first convex portion 21 is described in detail below.

First, the connection via hole 210 which exposes only a sidewall on one side of the first convex portion 21 is described.

Referring to FIG. 4, in some embodiments, on the basis of the above-described embodiment, the connection via hole 210 exposes a sidewall of one side of the first convex portion 21.

As shown in FIG. 4, the connection via hole 210 in the insulation layer 200 according to the present embodiment may expose only the sidewall on one side of the first convex portion 21 in the signal transmission layer 100 to ensure a single-side contact and connection of the touch layer 300 to the signal transmission layer 100 through the connection via hole 210 and the exposed side wall of the first convex portion 21, to facilitate the transmission of the touch signals. Further, the connection via hole 210 exposing only the sidewall on one side of the first convex portion 21 in the signal transmission layer 100 may ensure that the preparation process of the connection via hole 210 is simple and may prevent the difficulty of process in opening the connection via hole from being increased by the preparation of connection via hole 210 with a large area.

Referring to FIG. 4, in some embodiments, the third concave-convex structure 40 includes a third concave portion 41 recessed away from the signal transmission layer 100. The second concave portion 32 includes a first opening region having a first opening size L1; the third concave portion 41 includes a second opening region having a second opening size L2; and the first opening size L1 and the second opening size L2 satisfy $|L1-L2|/L1 \leq 10\%$; and in a first direction X, a distance L3 between a center of the first opening region and a center of the second opening region satisfies $0<L3<L2/2$; and the first direction X is parallel to a direction in which the second convex portion 31 is directed to the second concave portion 32.

In the case where the third concave portion 41 of the third concave-convex structure 40 in the first film layer 400 is provided with the second opening region, and the second opening size L2 of the second opening region is equivalent to the first opening size L1 of the second concave portion 32 in the insulation layer 200, that is, $|L1-L2|/L1 \leq 10\%$, in order to make the second connecting portion 33 and the sidewall of the first convex portion 21 have an overlapping region to realize the contact and connection of the touch layer 300 to the first concave-convex structure 20 in the signal transmission layer 100, the center of the first opening region in the second concave portion 32 needs to be offset from the center of the second opening region in the third concave portion 41 by a distance in the first direction X, for example, in the first direction X, the distance L3 between a center of the first opening region and a center of the second opening region needs to satisfy $0<L3<L2/2$, to ensure that there is an overlap between the second connecting portion 33 and the side wall of the first convex portion 21, and ensure that the process of opening the connecting via hole 210 is simple.

It should be noted that the first opening region can be understood as an opening size at a side, close to the signal transmission layer 100, of the second concave portion 32, that is, a minimum opening size of the second concave portion 32; and the second opening region can be understood as an opening size at a side, away from the signal transmission layer 100, of the third concave portion 41, that is, a minimum opening size of the third concave portion 41. In embodiments of the present disclosure, the above minimum opening sizes are taken as an example for description to ensure that a relative positional relationship between the second concave portion 32 and the third concave portion 41 is more accurate.

Next, the connection via hole 210 which exposes sidewalls of two sides of the first convex portion 21 is described.

Figure 5:
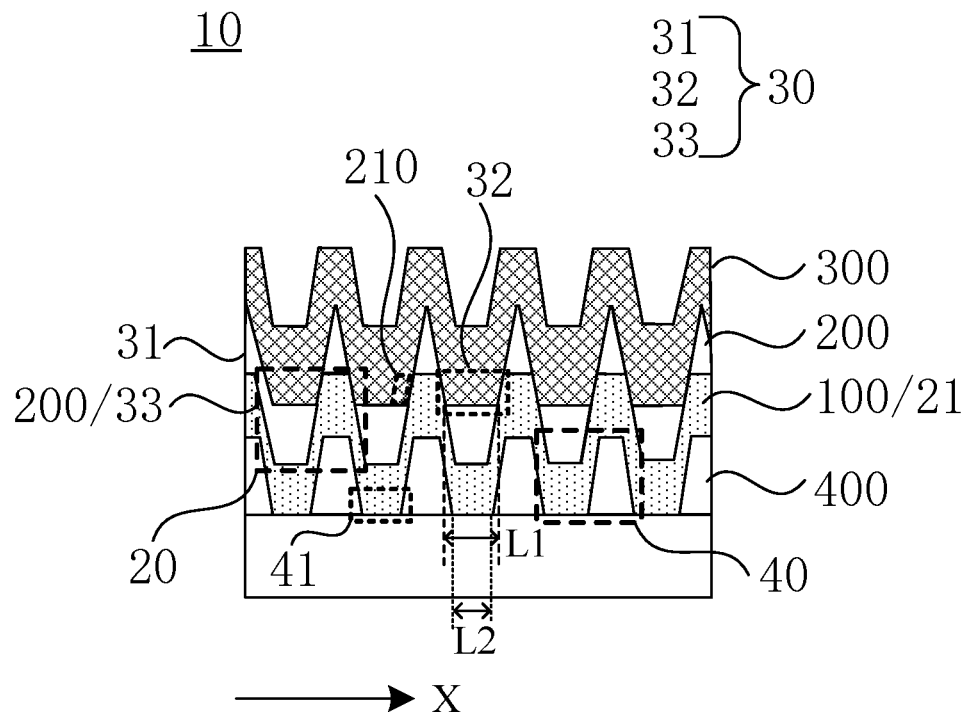
FIG. 5 is still another schematic cross-sectional view taken along the sectional line AA' in FIG. 2.

FIG. 5 is still another schematic cross-sectional view taken along the sectional line AA' in FIG. 2. As shown in FIG. 5, in some embodiments, the connection via hole 210 exposes sidewalls of two sides of the first convex portion 21.

The connection via hole 210 in the insulation layer 200 of the present embodiment may expose the sidewalls of two sides of the first convex portion 21 in the signal transmission layer 100, and the touch layer 300 is contacted and connected to the signal transmission layer 100 through the connection via hole 210 and the exposed sidewalls on the two sides of the first convex portion 21, to increase the contact area between the touch layer 300 and the signal transmission layer 100, facilitating connection, and increasing signal transmission rate.

Referring to FIG. 5, on the basis of the above-described embodiment, in some embodiments, the third concave-convex structure 40 includes a third concave portion 41 recessed away from the signal transmission layer 100. The second concave portion 32 includes a first opening region having a first opening size L1; the third concave portion 41 includes a second opening region having a second opening size L2; and the first opening size L1 and the second opening size L2 satisfy L2<L1≤2×L2, and the center of the first opening region coincides with the center of the second opening region.

In the case where the first opening size L1 of the second concave portion 32 in the insulation layer 200 is larger than the second opening size L2 of the third concave portion 41 in the first film layer 400 and smaller than twice of the second opening size L2, i.e., L2<L1≤2×L2, the sidewalls on the two sides of the first convex portion 21 in the signal transmission layer 100 can be exposed, which facilitates the contact and connection of the touch layer 300 and the signal transmission layer 100. Nesting holes may also be designed and the center of the first opening region in the second concave portion 32 coincides with the center of the second opening region in the third concave portion 41 in the first direction X, to simplify the process flow and reducing the process difficulty. The first direction X is parallel to the direction in which the second convex portion 31 is directed to the second concave portion 32.

Next, the connection via hole 210 penetrating the second connecting portion 33 and the second convex portion 31 is described.

Figure 6:
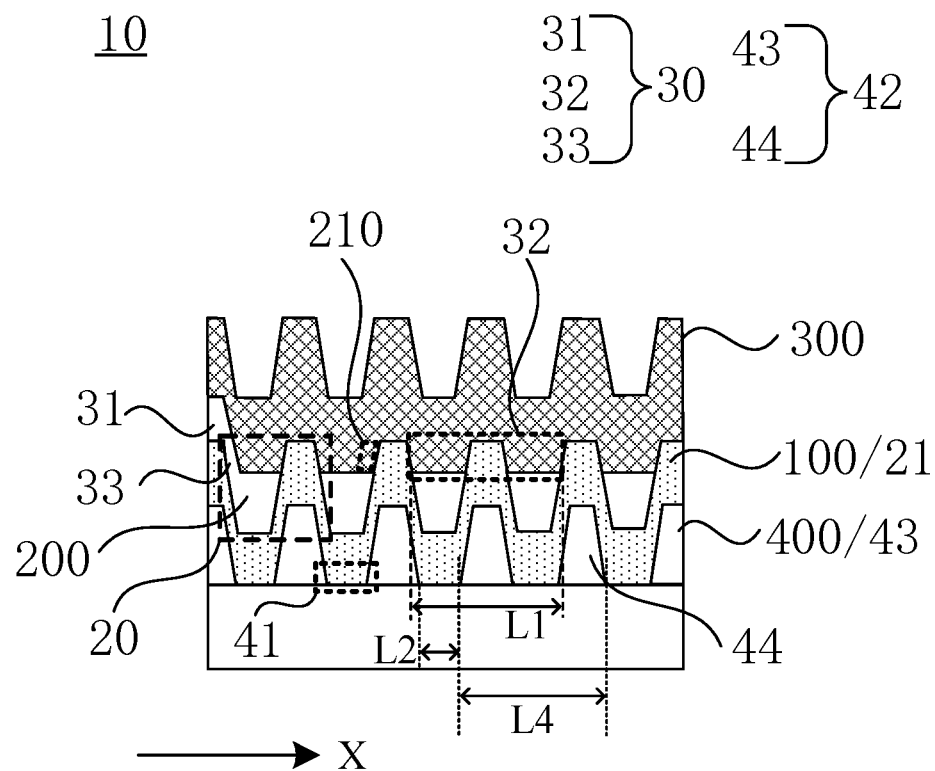
FIG. 6 is still another schematic cross-sectional view taken along the sectional line AA' in FIG. 2.

FIG. 6 is still another schematic cross-sectional view of FIG. 2 taken along the sectional line AA' in FIG. 2; as shown in FIG. 6, in some embodiments, the connection via hole 210 penetrates the second connecting portion 33 and the second convex portion 31.

In the present embodiment, the connection via hole 210 may penetrate both the second connecting portion 33 and the second convex portion 31 in the insulation layer 200. The second connecting portion 33 has a small thickness, which facilitates being completely etched. The second convex portion 31 is closer to the touch layer 300, and the second convex portion 31, when having the connection via hole 210 formed therein, has a small depth. By providing the connection via hole 210 penetrating the second connecting portion 33 and the second convex portion 31, the electrical connection area between the touch layer 300 and the signal transmission layer 100 can be increased, to facilitate the contact and connection, and moreover, the contact resistance can be reduced, and the signal transmission rate can be increased.

With reference to FIG. 6, in some embodiments, the first concave-convex structure 20 includes a first convex portion 21 protruding towards the insulation layer 100; and in the light exit direction of the touch display panel 10, the second concave portion 32 and the second connecting portion 33 overlap with at least one first convex portion 21, and the connection via hole 210 exposes an upper surface of the at least one first convex portion 21 and sidewalls of two sides of the at least one first convex portion 21.

In order for the touch layer 300 to be contacted and connected, to the signal transmission layer 100 through the connection via hole 210 penetrating the second connecting portion 33 and the second convex portion 31 in the insulation layer 200, it is required to have an overlapping region between the second concave portion 32 and the first convex portion 21 in the signal transmission layer 100 as well as between the second connecting portion 33 and the first convex portion 21, to form the connection via hole 210 penetrating the second connecting portion 33 and the second convex portion 31 in the overlapping region to expose the upper surface and the sidewalls on the two sides of the first convex portion 21 in the signal transmission layer 100, to further increase the contact and connection area between the touch layer 300 and the signal transmission layer 100, reducing the contact resistance, and increasing the signal transmission rate.

It should be noted that in a case where a contact and connection area between the touch layer 300 and the signal transmission layer 100 is too large, a tip discharge effect may occur when a film deposition is performed for the signal transmission layer 100, which may adversely affect a film deposition means and reduce the service life thereof. Therefore, in order to avoid the tip discharge effect, a number of the first convex portions 21 that overlap with the second concave portions 32 and the second connecting portions 33 in the insulation layer 200 respectively may be properly set, to further control the area of the first convex portions 21 exposed by the connection via holes 210 to reduce the contact and connection area. In order to ensure normal transmission of the touch signals, the second concave portion 32 and the second connecting portion 33 are required to overlap at least one first convex portion 21, to allow the connection via hole 210 to expose the upper surface and the sidewalls on the two sides of the at least one first convex portion 21 to realize an electrical connection between the touch layer 300 and the signal transmission layer 100.

Referring to FIG. 6, in some embodiments, the third concave-convex structure 40 includes a third convex portion 42 protruding towards the signal transmission layer 100, the third convex portion 42 including a first sub-convex-portion 43 and a second sub-convex-portion 44 arranged adjacent to each other in the first direction X, the first sub-convex-portion 43 includes a first edge away from the second sub-convex-portion 44, and the second sub-convex-portion 44 includes a second edge away from the first sub-convex-portion 43. The first direction X is parallel to the direction in which the second convex portion 31 is directed to the second concave portion 32. The second concave portion 32 includes a first opening region having a first opening size L1, and in the first direction X, the first opening size L1 is equal to the distance L4 between the first edge and the second edge.

For convenience of explanation, the third convex portion 42 of the first film layer 400 is divided into the first sub-convex-portion 43 and the second sub-convex-portion 44, and the first sub-convex-portion 43 and the second sub-convex-portion 44 are arranged adjacent to each other in the first direction X. In a case where the first opening size L1 of the second concave portion 32 in the insulation layer 200 is equal to the distance L4 between the first edge of the first sub-convex-portion 43 and the second edge of the second sub-convex-portion 44 adjacent to the first sub-convex-portion 43 in the first film layer 400, no matter how much offset by which the second concave portion 32 is formed in punching, it can be ensured that at least one second concave-convex structure 30 is in contact and connection with the touch layer 300, to ensure normal transmission of the touch signal.

Referring to FIG. 6, in some embodiments, the third concave-convex structure 40 includes a third concave portion 41 recessed away from the signal transmission layer 100. The second concave portion 32 includes a first opening region having a first opening size L1; the third concave portion 41 includes a second opening region having a second opening size L2; and the first opening size L1 and the second opening size L2 satisfy L1>2×L2.

In the case where the first opening size L1 of the second concave portion 32 in the insulation layer 200 is larger than twice of the second opening size L2 of the third concave portion 41 in the first film layer 400, that is, L1>2×L2, the upper surface of the first convex portion 21 and the sidewalls on the two sides of the first convex portion 21 in the signal transmission layer 100 may be exposed, and the electrical connection area between the touch layer 300 and the signal transmission layer 100 may be increased, and the contact and connection of the touch layer 300 to the signal transmission layer 100 may be facilitated.

As described above, the sizes of and the positional relationship between the first opening region in the second concave portion 32 and the second opening region in the third concave portion 41 are properly set, to ensure that at least one sidewall of the first convex portion 21 can be exposed through the connection via hole 210, and thus, the contact and connection between the touch layer 300 and the signal transmission layer 100 can be realized, the touch signal can be normally transmitted, and the touch layer 300 can operate normally.

Figure 7:
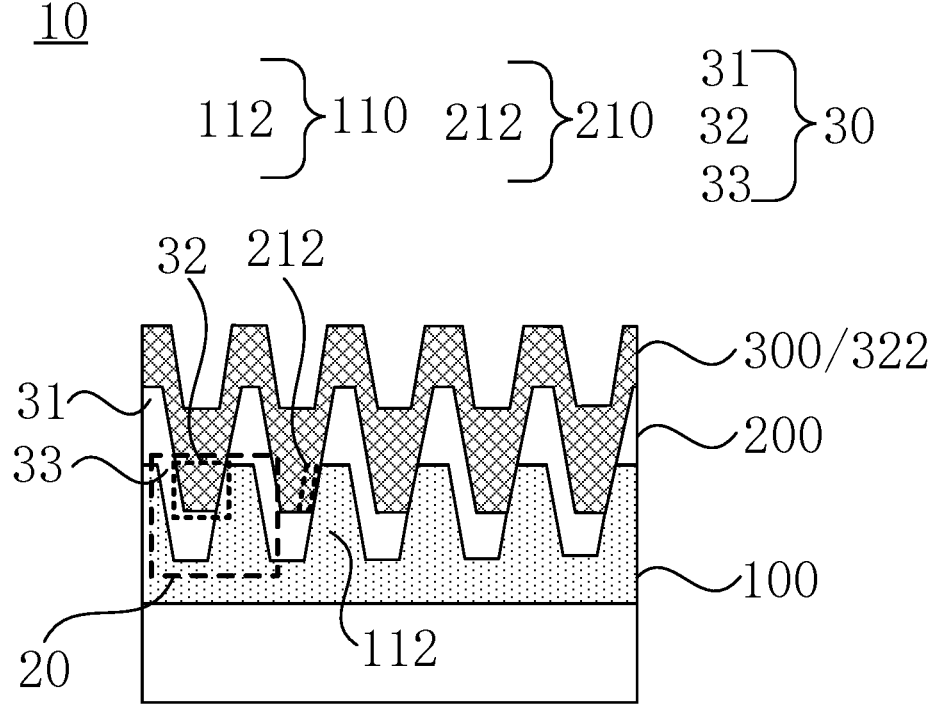
FIG. 7 is a schematic cross-sectional view taken along the sectional line AA' in FIG. 2.
Figure 8:
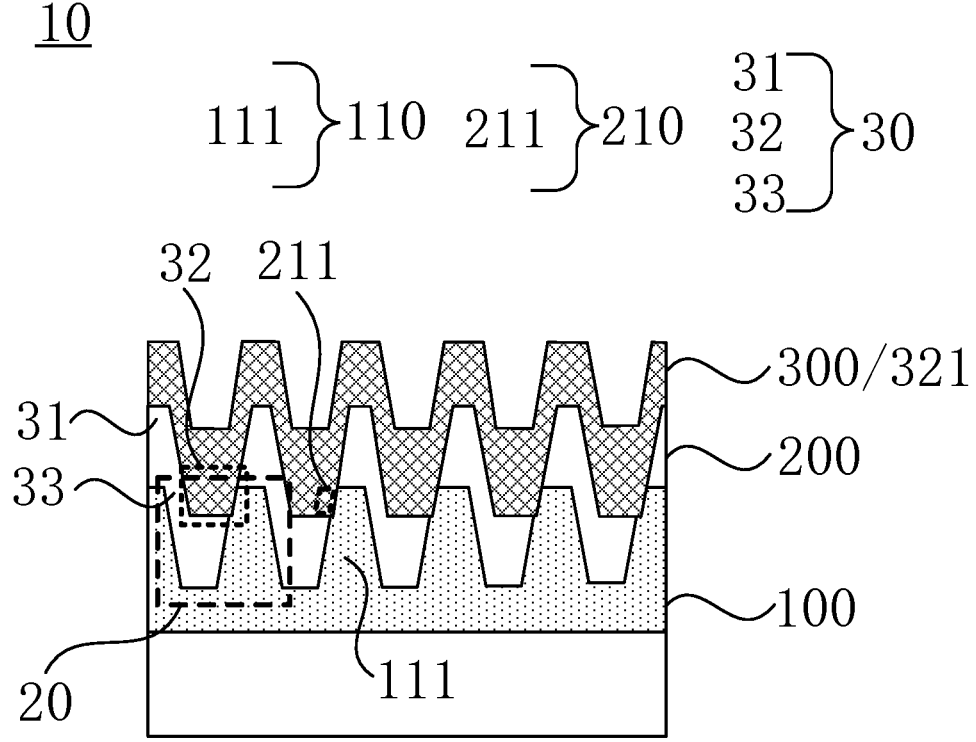
FIG. 8 is a schematic cross-sectional view taken along a sectional line BB' in FIG. 2.

FIG. 7 is a schematic cross-sectional view taken along the sectional line AA' in FIG. 2; and FIG. 8 is a schematic cross-sectional view taken along a sectional line BB' in FIG. 2. For example, referring to FIGS. 2, 7, and 8, in some embodiments, the touch layer 300 includes touch electrodes 310 and touch traces 320; the signal transmission layer 100 includes touch jumpers 110; and the touch display panel 10 further includes a touch drive chip 500. The touch electrodes 310 includes a first touch electrode 311 and a second touch electrode 312, the touch traces 320 includes a first touch trace 321 and a second touch trace 322. The touch jumpers 110 includes a first touch jumper 111 and a second touch jumper 112. The first touch trace 321 is electrically connected to each of the first touch electrode 311 and the first touch jumper 111, and the second touch trace 322 is electrically connected to each of the second touch electrode 312 and the second touch jumper 112. The first touch electrode 311 is located on a side, close to the touch drive chip 500, of the second touch electrode 312. A contact area between the first touch trace 321 and the first touch jumper 111 is smaller than a contact area between the second touch trace 322 and the second touch jumper 112.

The touch electrodes 310 is electrically connected to the signal transmission layer 100 through the touch traces 320 and the touch jumpers 110. The signal transmission layer 100 transmits a touch signal to the touch electrodes 310 electrically connected thereto to implement the touch control function. Since the distances between the touch drive chip 500 and different touch electrodes 310 may be different, the lengths of the touch traces 320 electrically connected to the touch electrodes 310 may be different, and when the length of the touch traces 320 is larger, the resistance of the touch traces is greater. When the same touch signal is transmitted through the touch traces 320 with different lengths, due to different touch trace resistances, the touch signals reaching the touch electrodes 310 in electrical connection with the touch traces 320, may be different and thus the touch control effect may be adversely affected. In order to balance the difference in touch signals caused by the touch traces 320 with different lengths, contact areas between the touch jumpers 110 and the touch traces 320 can be reasonably set.

In some embodiments, for convenience of explanation, the touch electrodes 310 is divided into a first touch electrode 311 and a second touch electrode 312. A distance from the first touch electrode 311 to the touch drive chip 500 and a distance from the second touch electrode 312 to the touch drive chip 500 are different. The first touch electrode 311 is located on the side, close to the touch drive chip 500, of the second touch electrode 312, that is, the distance between the second touch electrode 312 and the touch drive chip 500 is greater than the distance between the first touch electrode 311 and the touch drive chip 500. The first touch electrode 311 is electrically connected to the first touch jumper 111 of the signal transmission layer 100 by the first touch trace 321, and the second touch electrode 312 is electrically connected to the second touch jumper 112 of the signal transmission layer 100 by the second touch trace 322. Since the distance between the second touch electrode 312 and the touch drive chip 500 is larger than the distance between the first touch electrode 311 and the touch drive chip 500, the length of the second touch trace 322 is larger than that of the first touch trace 321, and the touch traces resistance of the second touch trace 322 is larger than that of the first touch trace 321. In this case, a contact area between the second touch trace 322 and the second touch jumper 112 is larger than a contact area between the first touch trace 321 and the first touch jumper 111, that is, the contact area between the touch traces 320 with a large touch trace resistance and the touch jumpers 110 correspondingly connected thereto is greater than the contact area between the touch traces 320 with a small touch trace resistance and the touch jumpers 110 correspondingly connected thereto, to balance the touch signals transmitted with the touch traces 320 having different lengths (touch trace resistances), and improve the touch control performance of the touch display panel 10.

It is to be noted that the touch electrodes 310 including two types of touch electrodes 310 having different distances from the touch drive chip 500, that is, the first touch electrode 311 and the second touch electrode 312 are only taken as an example in the above description. Determination of the number of types of the touch electrodes 310 having different distances from the touch drive chip 500 according to practical situations, as long as it can be ensured that a contact area between the touch traces 320 electrically connected to the touch electrodes 310 away from the touch drive chip 500 having a large touch trace resistance and the touch jumpers 110 correspondingly connected to this touch trace 320 is larger than a contact area between the touch traces 320 electrically connected to the touch electrodes 310 near the touch drive chip 500 having a small touch trace resistance and the touch jumpers 110 correspondingly connected to this touch trace 320.

Referring to FIG. 2, FIG. 7, and FIG. 8, in some embodiments, the touch layer 300 includes multiple touch electrodes 310, and a distance from one of any two touch electrodes 30 to the touch drive chip 500 is different from a distance from the other of the any two touch electrodes 30 to the touch drive chip 500. The touch layer 300 further includes multiple touch traces 320; and the touch traces 320 and the touch electrodes 310 are in a one to one correspondence, and any two of the touch traces 320 have different extension lengths in a second direction Y. The second direction Y intersects the light exit direction of the touch display panel 10, and intersects the direction in which the second convex portion 31 is directed to the second concave portion 32. The signal transmission layer 100 includes multiple touch jumpers 110, and the touch jumpers 110 and the touch traces 320 are in a one to one correspondence. In any two of the touch traces 320, a contact area between the touch traces 320 having a large extension length in the second direction Y and the touch jumpers 110 corresponding thereto is larger than a contact area between the touch traces 320 having a small extension length in the second direction Y and the touch jumpers 110 corresponding thereto.

For convenience of explanation, FIG. 2 shows only for example that the touch electrodes 310 includes four types of touch electrodes 310, and distances from the four types of touch electrodes to the touch drive chip 500 are different. The touch traces 310 are correspondingly connected to the touch electrodes 310, and as the distances from the touch traces 310 to the touch drive chip 500 are gradually decreased, the lengths of the touch traces 310 are sequentially reduced. Thus, the touch traces resistances corresponding to the above touch traces 310 are sequentially reduced. In order to balance the touch signals transmitted through the touch traces 310 having different lengths or different touch trace resistances, contact areas between the above touch traces 320 and the touch jumpers 110 correspondingly connected to the touch traces 320 can be set to be sequentially reduced, that is, the contact area between the touch traces 320 with a large length and a corresponding touch jumper 110 is set to be larger than the contact area between the touch traces 320 with a small length and a corresponding touch jumper 110.

Figure 9:
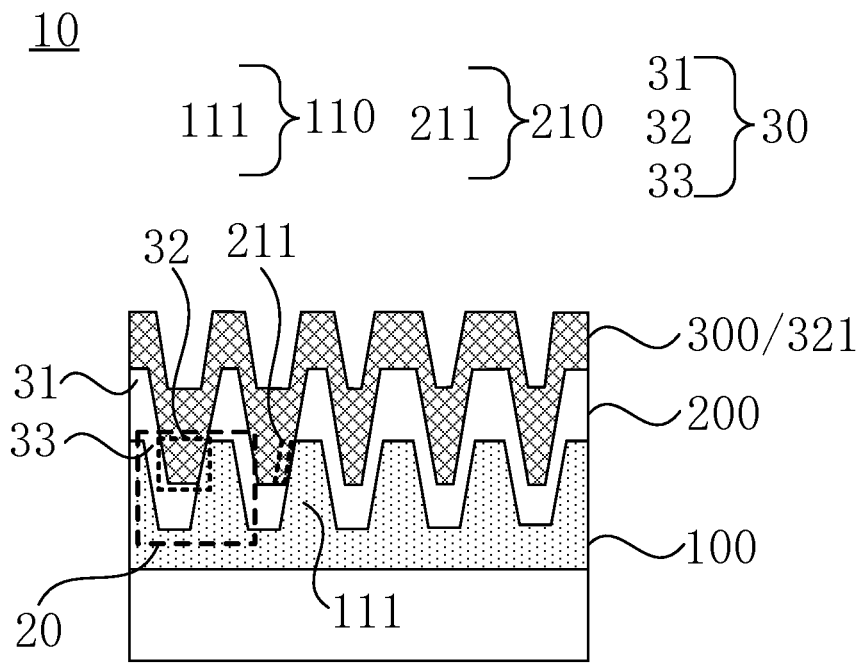
FIG. 9 is another schematic cross-sectional view taken along the sectional line BB' in FIG. 2.

FIG. 9 is another schematic cross-sectional view taken along the sectional line BB' in FIG. 2. Referring to FIG. 7, FIG. 8 and FIG. 9, in some embodiments, the first touch trace 321 is in contact with the first touch jumper 111 through a first type connection via hole 211 and the second touch trace 322 is in contact with the second touch jumper 112 through a second type connection via hole 212. An opening diameter of the first type connection via hole 211 is smaller than an opening diameter of the second type connection via hole 212, and/or a number of openings of the first type connection via hole 211 is smaller than a number of openings of the second type connection via hole 212.

For example, referring to FIG. 7 and FIG. 8, and with reference to the above description, the length (or, touch trace resistance) of the second touch trace 322 is larger than the length (or, touch trace resistance) of the first touch trace 321. Therefore, in order to balance the touch signals transmitted through the second touch trace 322 and the first touch trace 321, the contact area between the second touch trace 322 and the second touch jumper 112 is required to be larger than the contact area between the first touch trace 321 and the first touch jumper 111. For this purpose, the opening diameter of the second type connection via hole 212 exposing the second touch jumper 112 may be set larger than the opening diameter of the first type connection via hole 211 exposing the first touch jumper 111.

Referring to FIG. 7 and FIG. 9, further, for enabling the contact area between the second touch trace 322 and the second touch jumper 112 to be larger than the contact area between the first touch trace 321 and the first touch jumper 111, it may also set the number of openings of the second type connection via hole 212 exposing the second touch jumper 112 to be greater than the number of openings of the first type connection via hole 211 exposing the first touch jumper 111. That is, on the basis that the opening diameter of the first type connection via hole 211 and the opening diameter of the second type connection via hole 212 are the same, the difference in the contact area can be achieved by setting the number of openings.

Figure 10:
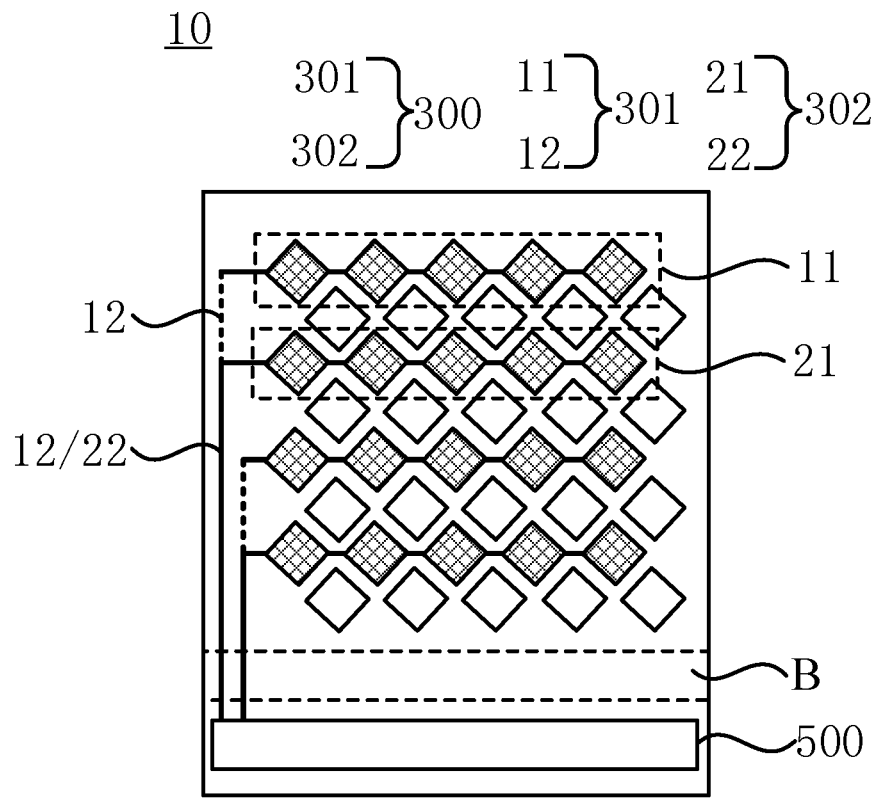
FIG. 10 is another schematic top view of a touch display panel according to embodiments of the present disclosure.

FIG. 10 is another schematic top view of a touch display panel according to embodiments of the present disclosure. As shown in FIG. 10, in some embodiments, the touch layer 300 includes a first touch layer 301 and a second touch layer 302. A sheet resistance of the first touch layer 301 is greater than a sheet resistance of the second touch layer 302. The first touch layer 301 includes a first sub-touch-electrode 11 and a first sub-touch-trace 12, and the second touch layer 302 includes a second sub-touch-electrode 21 and a second sub-touch-trace 22. The signal transmission layer 100 includes a first touch jumper and a second touch jumper. The first sub-touch-trace 12 is electrically connected to each of the first sub-touch-electrode 11 and the first touch jumper, and the second sub-touch-trace 22 is electrically connected to each of the second sub-touch-electrode 21 and the second touch jumper. A contact area between the first sub-touch-trace 12 and the first touch jumper is larger than a contact area between the second sub-touch-trace 22 and the second touch jumper.

In order to realize a narrow bezel design, the first sub-touch-trace 12 in the first touch layer 301 and the second sub-touch-trace 22 in the second touch layer 302 may be located in different film layers, and a vertical projection of the first sub-touch-trace 12 on a plane where the touch display panel 10 is located overlaps a vertical projection of the second sub-touch-trace 22 on a plane where the touch display panel 10 is located, that is, the first sub-touch-trace 12 covers the second sub-touch-trace 22 as shown in FIG. 10. The materials used for the first sub-touch-trace 12 and the second sub-touch-trace 22 in different film layers are different, and the sheet resistance of the first sub-touch-trace 12 and the sheet resistance of the second sub-touch-trace 22 are different, that is, the sheet resistance of the first touch layer 301 is different from the sheet resistance of the second touch layer 302, therefore, when the signal transmission layer 100 transmits a touch signal to each of the first sub-touch-trace 12 and the second sub-touch-trace 22, the touch signal reaching the first sub-touch-electrode 11 and the touch signal reaching the second sub-touch-electrode 21 are different. For balancing the touch signals transmitted through the touch traces or the touch layers 300 with different resistances, it may be set that the contact areas between the signal transmission layer 100 and the touch traces having different resistances are different. In some embodiments, in a case where the sheet resistance of the first sub-touch-trace 12 is greater than the sheet resistance of the second sub-touch-trace 22, it may be set that a contact area between the first sub-touch-trace 12 and the first touch jumper correspondingly connected thereto is larger than a contact area between the second sub-touch-trace 22 and the second touch jumper correspondingly connected thereto, that is, the contact area between the touch traces in the touch layer 300 having a large sheet resistance and the touch jumpers correspondingly connected to this touch trace is larger than the contact area between the touch traces in the touch layer 300 having a small sheet resistance and the touch jumpers correspondingly connected to this touch trace. In this way, the touch signals transmitted through the touch layers 300 having different sheet resistances are balanced, and also the width of the bezel region can be reduced, to realize the narrow bezel design.

It should be noted that, for the convenience of drawing, in FIG. 10, the first sub-touch-trace 12 is indicated as a dashed line, and the second sub-touch-trace 22 is indicated as a solid line. Since the first sub-touch-trace 12 and the second sub-touch-trace 22 overlap each other, there is an overlapping region between the first sub-touch-trace 12 and the second sub-touch-trace 22 in FIG. 10. However, in fact, the first sub-touch-traces 12 and the second sub-touch-traces 22 are located in different film layers, are two different touch traces, and are insulated from each other.

On the basis of the above embodiments, in some embodiments, the first sub-touch-trace 12 is in contact with the first touch jumper through a third type connection via hole, and the second sub-touch-trace 22 is in contact with the second touch jumper through a fourth type connection via hole. An opening diameter of the third type connection via hole is larger than an opening diameter of the fourth type connection via hole, and/or a number of openings of the third type connection via hole is greater than a number of openings of the fourth type connection via hole.

For enabling the contact area between the first sub-touch-trace 12 in the first touch layer 301 having a large sheet resistance and the first touch jumper correspondingly connected to the first sub-touch-trace 12 to be larger than the contact area between the second sub-touch-trace 22 in the second touch layer 302 having a small sheet resistance and the second touch jumper correspondingly connected to the second sub-touch-trace 22, it may be set that an opening diameter of the third type connection via hole exposing the first touch jumper is larger than an opening diameter of the fourth type connection via hole exposing the second touch jumper; it may also be set that the number of openings of the third type connection via hole exposing the first touch jumper is greater than the number of openings of the fourth type connection via hole exposing the second touch jumper. That is, on the basis that the opening diameters of the third type connection via hole and the fourth type connection via hole are the same, different contact areas may be realized by setting the number of openings.

Referring to FIG. 2, in some embodiments, the touch display panel 10 includes a step bending region B; and at least in the step bending region B, the touch layer 300 is electrically connected to the signal transmission layer 100 through the connection via hole 210.

The step bending region B is located in a non-display region of the display panel, where a connection via hole 210 is formed to realize contact and connection of the touch layer 300 to the signal transmission layer 100, which will not adversely affect the display function of the display region. A connection via hole 210 may be provided, to realize contact and connection of the touch layer 300 to the signal transmission layer 100, in regions other than the step bending region B according to practical requirements, which is not limited by the embodiments of the present disclosure.

Referring to FIG. 4, in some embodiments, the first film layer 400 includes an organic layer.

The first film layer 400 may be an organic layer, such as a planarization layer. The thickness of the organic layer is generally large, and may have a deep via hole provided therein, that is, a third concave-convex structure 40 in concave and convex are easily formed on the first film layer 400. In this way, it can be ensured that each of the signal transmission layer 100, the insulation layer 200, and the touch layer 300 located above the first film layer 400 can be provided with the concave-convex structure, to facilitate contact and connection of the touch layer 300 to the signal transmission layer 100.

Referring to FIG. 3, in some embodiments, the insulation layer 200 includes an inorganic insulation layer, that is, the insulation layer 200 is made from an inorganic material, and the inorganic material is usually prepared using a chemical vapor deposition method. This preparation method tends to cause the thickness of the insulation layer 200 to be uneven, a thicker position may exist, and etching may be incomplete when the connection via hole 210 is formed at a thicker position, resulting in failure of contact or connection of the touch layer 300 to the signal transmission layer 100, and the touch control function is adversely affected accordingly.

It will be understood that the materials of the first film layer 400 and the insulation layer 200 are shown above only by way of example, and may be provided according to practical requirements.

Figure 11:
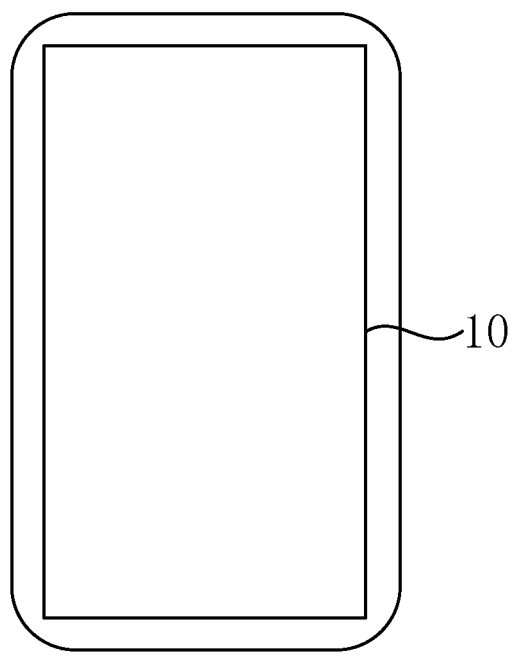
FIG. 11 is a schematic structural view of a touch display device according to embodiments of the present disclosure.

A touch display device is further provided according to embodiments of the present disclosure. FIG. 11 is a schematic structural view of a touch display device according to embodiments of the present disclosure. As shown in FIG. 11, the touch display device includes the touch display panel 10 according to any embodiment of the present disclosure. Since the touch display device includes any of the touch display panels 10 described above, the touch display device has corresponding functions and beneficial effects.

It is to be noted that embodiments in the specification are described in a progressive manner. Each embodiment focuses on its differences from other embodiments. The same or similar parts in the embodiments can be referred to by each other.

What is claimed is:

1. A touch display panel, comprising a signal transmission layer, an insulation layer, and a touch layer which are disposed in stack,
wherein a surface of the signal transmission layer is provided with a first concave-convex structure;
the insulation layer covers the first concave-convex structure, a surface of the insulation layer is provided with a second concave-convex structure at least partially overlapping the first concave-convex structure in a light exit direction of the touch display panel, the second concave-convex structure comprises a second convex portion protruding towards the touch layer, a second concave portion recessed towards the signal transmission layer, and a second connecting portion connecting each of the second convex portion and the second concave portion, and a thickness of the second connecting portion is smaller than either a thickness of the second convex portion or a thickness of the second concave portion; and
a connection via hole is further provided, the connection via hole penetrates at least the second connecting portion and exposes part of the signal transmission layer, and the touch layer is electrically connected to the signal transmission layer through the connection via hole.

2. The touch display panel according to claim 1, further comprising a first film layer on a side, away from the insulation layer, of the signal transmission layer, wherein a surface of the first film layer is provided with a third concave-convex structure; and the signal transmission layer covers the third concave-convex structure and the first concave-convex structure is arranged corresponding to the third concave-convex structure.

3. The touch display panel according to claim 2, wherein the first concave-convex structure comprises a first convex portion protruding towards the insulation layer; and in the light exit direction of the touch display panel, the second connecting portion at least partially overlaps a sidewall of the first convex portion, and the connection via hole exposes a sidewall of at least one side of the first convex portion.

4. The touch display panel according to claim 3, wherein the connection via hole exposes a sidewall of one side of the first convex portion.

5. The touch display panel according to claim 4, wherein the third concave-convex structure comprises a third concave portion recessed away from the signal transmission layer;

the second concave portion comprises a first opening region having a first opening size, and the third concave portion comprises a second opening region having a second opening size;

the first opening size L1 and the second opening size L2 satisfy |L1−L2|/L1≤10%; and in a first direction, a distance L3 between a center of the first opening region and a center of the second opening region satisfies 0<L3<L2/2, and the first direction is parallel to a direction in which the second convex portion is directed to the second concave portion.

6. The touch display panel according to claim 3, wherein the connection via hole exposes sidewalls of two sides of the first convex portion.

7. The touch display panel according to claim 6, wherein the third concave-convex structure comprises a third concave portion recessed away from the signal transmission layer;

the second concave portion comprises a first opening region having a first opening size, and the third concave portion comprises a second opening region having a second opening size; and the first opening size L1 and the second opening size L2 satisfy L2<L1≤2×L2, and the center of the first opening region coincides with the center of the second opening region.

8. The touch display panel according to claim 2, wherein the connection via hole penetrates the second connecting portion and the second convex portion.

9. The touch display panel according to claim 8, wherein the first concave-convex structure comprises a first convex portion protruding towards the insulation layer; and in the light exit direction of the touch display panel, the second concave portion and the second connecting portion overlap with at least one first convex portion, and the connection via hole exposes an upper surface of the at least one first convex portion and sidewalls of two sides of the at least one first convex portion.

10. The touch display panel according to claim 9, wherein the third concave-convex structure comprises a third convex portion protruding towards the signal transmission layer, the third convex portion comprises a first sub-convex-portion and a second sub-convex-portion arranged adjacent to each other in a first direction, the first sub-convex-portion comprises a first edge away from the second sub-convex-portion, the second sub-convex-portion comprises a second edge away from the first sub-convex-portion, and the first direction is parallel to a direction in which the second convex portion is directed to the second concave portion;

the second concave portion comprises a first opening region having a first opening size; and in the first direction, the first opening size is equal to a distance between the first edge and the second edge.

11. The touch display panel according to claim 9, wherein the third concave-convex structure comprises a third concave portion recessed away from the signal transmission layer;

the second concave portion comprises a first opening region having a first opening size, and the third concave portion comprises a second opening region having a second opening size; and the first opening size L1 and the second opening size L2 satisfy L1>2×L2.

12. The touch display panel according to claim 1, wherein the touch layer comprises touch electrodes and touch traces; the signal transmission layer comprises touch jumpers; the touch display panel further comprises a touch drive chip;

the touch electrodes comprise a first touch electrode and a second touch electrode, the touch traces comprise a first touch trace and a second touch trace, the touch jumpers comprise a first touch jumper and a second touch jumper, the first touch trace is electrically connected to each of the first touch electrode and the first touch jumper, and the second touch trace is electrically connected to each of the second touch electrode and the second touch jumper; and the first touch electrode is located on a side, close to the touch drive chip, of the second touch electrode, and a contact area between the first touch trace and the first touch jumper is smaller than a contact area between the second touch trace and the second touch jumper.

13. The touch display panel according to claim 12, wherein the touch layer comprises a plurality of touch electrodes, and a distance from one of any two of the plurality of touch electrodes to the touch drive chip is different from a distance from the other of any two of the plurality of touch electrodes to the touch drive chip;

the touch layer further comprises a plurality of touch traces, wherein the plurality of touch traces and the plurality of touch electrodes are in a one to one correspondence, and any two of the plurality of touch traces have different extension lengths in a second direction, the second direction intersects the light exit direction of the touch display panel and intersects a direction in which the second convex portion is directed to the second concave portion;

the signal transmission layer comprises a plurality of touch jumpers, the plurality of touch jumpers and the plurality of touch traces are in a one to one correspondence; and in any two of the plurality of touch traces, a contact area between a touch trace having a longer extension length in the second direction and a corresponding touch jumper is larger than a contact area between a touch trace having a shorter extension length in the second direction and a corresponding touch jumper.

14. The touch display panel according to claim 12, wherein the first touch trace is in contact with the first touch jumper through a first type connection via hole, and the second touch trace is in contact with the second touch jumper through a second type connection via hole; and the first type connection via hole and the second type connection via hole satisfy at least one of: an opening diameter of the first type connection via hole is smaller than an opening diameter of the second type connection via hole, or, a number of openings of the first type connection via hole is smaller than a number of openings of the second type connection via hole.

15. The touch display panel according to claim 1, wherein the touch layer comprises a first touch layer and a second touch layer, a sheet resistance of the first touch layer is greater than a sheet resistance of the second touch layer;

the first touch layer comprises a first sub-touch-electrode and a first sub-touch-trace, and the second touch layer comprises a second sub-touch-electrode and a second sub-touch-trace;

the signal transmission layer comprises a first touch jumper and a second touch jumper;

the first sub-touch-trace is electrically connected to each of the first sub-touch-electrode and the first touch jumper, and the second sub-touch-trace is electrically connected to each of the second sub-touch-electrode and the second touch jumper; and a contact area between the first sub-touch-trace and the first touch jumper is larger than a contact area between the second sub-touch-trace and the second touch jumper.

16. The touch display panel according to claim 15, wherein the first sub-touch-trace is in contact with the first touch jumper through a third type connection via hole, and the second sub-touch-trace is in contact with the second touch jumper through a fourth type connection via hole; and the third type connection via hole and the fourth type connection via hole satisfy at least one of: an opening diameter of the third type connection via hole is larger than an opening diameter of the fourth type connection via hole, or, a number of openings of the third type connection via hole is greater than a number of openings of the fourth type connection via hole.

17. The touch display panel according to claim 1, wherein the touch display panel comprises a step bending region; and at least in the step bending region, the touch layer is electrically connected to the signal transmission layer through the connection via hole.

18. The touch display panel according to claim 2, wherein the first film layer comprises an organic layer.

19. The touch display panel according to claim 1, wherein the insulation layer comprises an inorganic insulation layer.

20. A touch display device, comprising a touch display panel, wherein the touch display panel comprising a signal transmission layer, an insulation layer, and a touch layer which are disposed in stack, wherein a surface of the signal transmission layer is provided with a first concave-convex structure;

the insulation layer covers the first concave-convex structure, a surface of the insulation layer is provided with a second concave-convex structure at least partially overlapping the first concave-convex structure in a light exit direction of the touch display panel, the second concave-convex structure comprises a second convex portion protruding towards the touch layer, a second concave portion recessed towards the signal transmission layer, and a second connecting portion connecting each of the second convex portion and the second concave portion, and a thickness of the second connecting portion is smaller than either a thickness of the second convex portion or a thickness of the second concave portion; and a connection via hole is further provided, the connection via hole penetrates at least the second connecting portion and exposes part of the signal transmission layer, and the touch layer is electrically connected to the signal transmission layer through the connection via hole.

* * * * *